T. J. Sloan,
Making Wood Screws,
No. 234. Reissued Mar. 29, 1853.
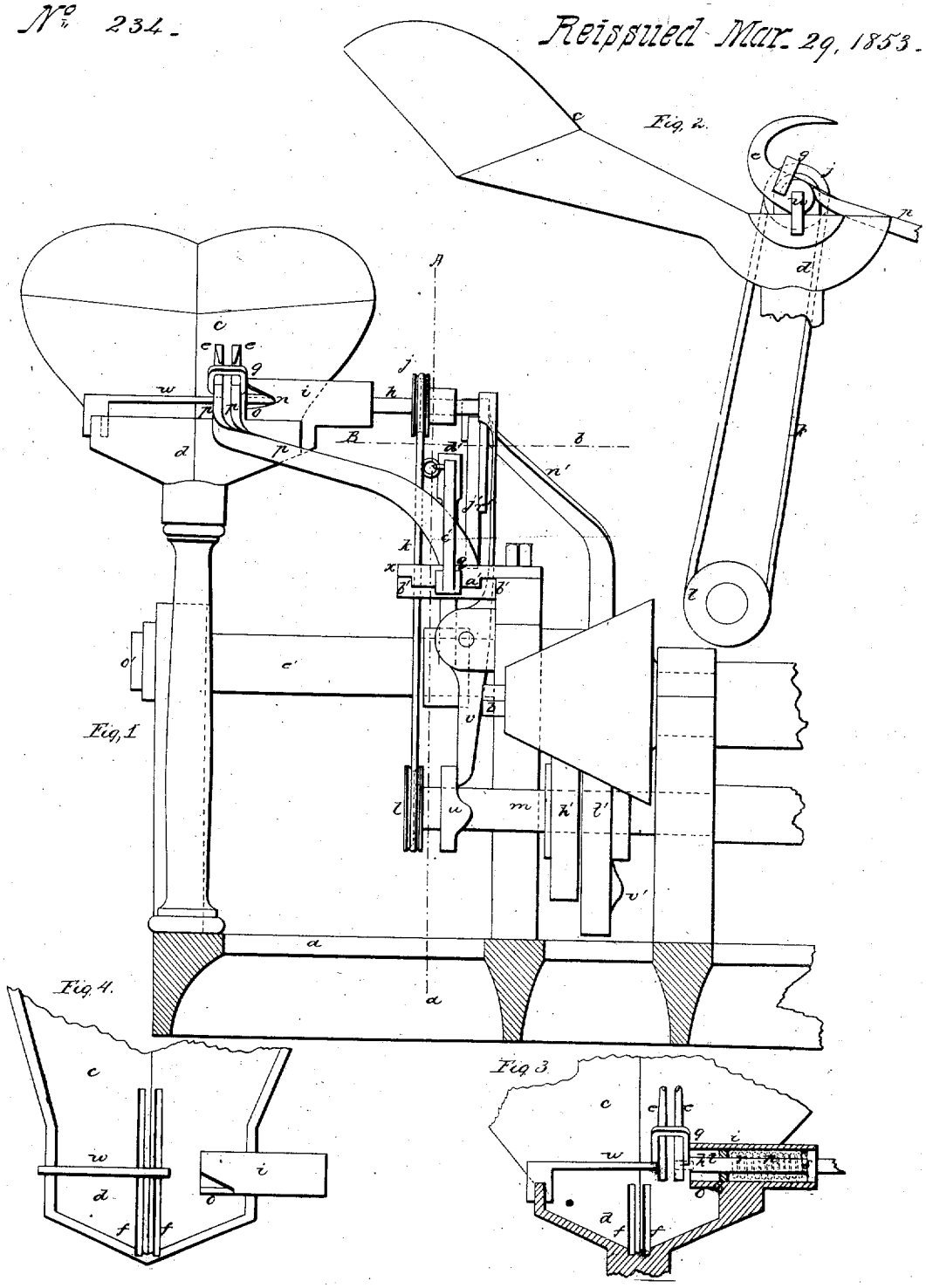

UNITED STATES PATENT OFFICE.

THOMAS J. SLOAN, OF NEW YORK, N. Y.

MACHINE FOR ARRANGING AND FEEDING SCREW-BLANKS.

Specification forming part of Letters Patent No. 7,958, dated February 25, 1851; Reissue No. 234, dated March 29, 1853.

*To all whom it may concern:*

Be it known that I, THOMAS J. SLOAN, of the city, county, and State of New York, have invented a new and useful machine for performing the various operations of arranging and feeding blanks in the manufacture of wood-screws, which invention is also applicable to the feeding in of pins and other articles formed with a shank and head; and I do hereby declare that the following is a full, clear, and exact description of the said machine, reference being had to the accompanying drawings, making part of this specification, in which—

Figure 1 is a front elevation; Fig. 2, a sectional elevation of the hopper and what is termed the "lifting-feeder;" Fig. 3, a vertical section of the same; Fig. 4, a horizontal section of the hopper; Fig. 5, a vertical section of the machine, taken at the line A *a* of Fig. 1; Fig. 6, a horizontal section taken at the line B *b* of Fig. 1; Fig. 7, sectional views of the transferring-fingers, and Fig. 8 sectional views of the sliding carrier.

The same letters indicate like parts in all the figures.

The object of my invention is to take screw-blanks in the various stages of their manufacture (or pins or other like articles) from a hopper into which they are thrown, and present them in regular succession to the gripping-jaws in the various machines, in which they are either shaved around the head, nicked, or threaded, or in which any other operation is to be performed requiring them to be presented in succession and each in the same position.

The nature of the first part of my invention consists in taking the screw-blanks or screws (or other like articles) from a hopper by means of hooked or bent lifters having a space between them sufficient for the free passage of the shanks while the heads rest on them, and lifting and transferring them to inclined ways, down which they descend with their heads resting on the ways, and the shanks hanging down between them.

The second part of my invention relates to the method of detecting when the inclined ways are fully supplied, and arresting the further operation (until required) of the lifters; and this part of my invention consists in giving a lateral motion either to the lifters or to the inclined ways, which lateral motion in one direction is required to permit the lifting motion of the lifters, and which is prevented, when the ways are fully supplied, by bringing the screw-blanks, &c., in contact with a stop.

The third part of my invention consists in the employment of a sliding plate called a "carrier," which has a recess to receive the screw-blanks, one at a time, from the ways or fountain, and hold and carry them forward, in combination with a pair of transferring spring-fingers, which, when forced down, are opened by the screw-blank, and then grasp and transfer and present it to the jaws, whether of a thread or other machine.

In the accompanying drawings, *a* represents the frame of the machine, which can be adapted to any machine requiring to be supplied with screw-blanks or other like articles; and *b* represents the head or gripping-jaws of a machine for heading screw-blanks, as illustrative of the mode of applying my said invention.

The screw-blanks are supplied in any desired quantity on the part *c* of a hopper, from which they descend into the part *d*, which is of a semicircular form concentric with the shaft of the lifters *e e*. The bottom of the said hopper has two parallel grooves, *f f*, in which the points of the lifters pass in their rotation, that they may with more certainty pass under the blanks in the hopper. The lifters *e e* are curved or hook formed, and brought to a point, or nearly so, at their outer end, and connected together at their inner ends by a brace-piece, *g*, so that the space between them shall be of sufficient capacity for the shanks of the blanks to hang freely between them, while their heads rest on the inner curved faces. They are attached to one end of a shaft or spindle, *h*, which turns in a sleeve, *i*, attached to one side of the hopper; and the outer end of the said shaft carries a pulley, *j*, around which passes a band, *k*, from a pulley, *l*, on the driving or cam shaft *m*, by means of which the required revolving motion is given to the lifters. As the lifters revolve, their points pass under the blanks in the hopper, and as they rise therefrom some of the shanks of some of the blanks will fall in between the two lifters, and their heads will be caught and rest on their inner curved surfaces, and as the lifters continue their revolutions the blanks hanging thereto will slide toward their inner ends—that is, toward the axis—and when they have reached the position represented in Figs. 1, 2, and 3, with the points up, the further revolution is stopped by a pin, *n*, on the shaft or spindle coming in contact with a shoulder, *o*, on the end of the sleeve. In this position the inner end of the lifters constitute the continuations of two inclined ways, *p p*, which have a space between them sufficient to receive the shanks of the blanks and permit them to pass and hang freely between them while hanging by their heads on the upper surface of the ways. The inclination of the ways should be sufficient to permit the blanks to descend by gravity. It will therefore be evident that when the lifters are brought to the position specified, the blanks hanging between them will slide therefrom onto the ways, and thence pass down to the delivery end *q*, where the ways are curved to deposit them in a horizontal position; but if they are to be delivered in a vertical position, then the ways are not to be thus curved.

The lifters are forced toward the sleeve in which their spindle rotates by means of a helical spring, *r*, surrounding the spindle, and which bears at one end against a shoulder, *s*, on the spindle, and the other end against a shoulder, *t*, in the sleeve; and so long as the stop-pin *n* rests against the shoulder of the sleeve the lifters will remain at rest, the driving-band slipping on the pulleys. If, however, motion be communicated by means of cog-gearing, a friction-clutch should be interposed.

When the lifters are to be restarted, the spindle must be pushed out until the stop-pin *n* is carried beyond the end of the shoulder of the sleeve, and this lateral motion must be sufficient to carry the lifters to the side of the inclined ways *p p*, that they may pass by the ways in their revolution, and they are kept in this lateral position by the stop-pin turning against the end of the sleeve; but when the lifters have passed through the hopper they are forced laterally to come in a line with the inclined ways by the tension of the spring, the sleeve being cut out or inclined inward to the shoulder to admit the stop-pin. The outward motion to carry the stop-pin beyond the shoulder is given by a cam, *u*, on the driving-shaft which acts on one end of a lever, *v*, the other end of which bears against the end of the spindle of the lifters.

The upper arm of the lever *v* is a spring, so that it may yield to permit the passage of the cam without moving the lifters when their operation is suspended, by reason of the ways being freely supplied with blanks. As the operation of the lifters will be irregular, sometimes taking a full supply and sometimes failing to take any, they are made of sufficient capacity to hold several blanks, to insure a full supply. This, however, cannot be regulated to correspond with the delivery of the blanks from the ways, and therefore the lifters should supply more than enough, and to prevent any evil arising in consequence of this, a hole is made through the lifters in the line of the axis of the spindle, in which is inserted one end of a cylindrical pin, *w*, called the "detector," attached to the side of the hopper, so that when the cam *u* acts on the lever *v* to push the lifters, if the blanks have not passed from the lifters to the ways, they come in contact with the end of the detector, which prevents the lifters from moving laterally. The lever then bends to permit the cam to pass for the next operation, and if then the blanks have passed onto the ways the lifters are moved and perform another lifting operation. In this way a full supply is always insured to to the inclined ways.

The curved ends of the ways are attached to a plate, *x*, with a hole, *y*, through which the blanks in succession pass to be delivered into a recess, *z*, in a carrier, *a'*, which is a plate sliding in appropriate ways, *b'*, under the plate *x*. The carrier is jointed to one end of a rod, *c'*, which at its other end is connected with the arm *d'* of a rock-shaft, *e'*, by a spring, *f'*, which permits the arm to move without the connecting-rod and carrier whenever the blank has failed to enter the recess, and thus avoid breakage; but when the blank has properly entered, the tension of this spring is sufficient to draw out the plate to carry the blanks to the proper position for the next operation to be hereinafter described, and then the carrier is moved back by the wrist-pin in the arm which works in the slot *g'* in the connecting-rod.

The rock-shaft *e'*, for working the carrier, is operated by a cam, *h'*, on the driving-shaft, which acts on another arm, *i'*, of the said rock-shaft.

So soon as the blank has been carried out by the carrier, a pair of transferring-fingers, *j' j'*, take it and transfer it to the jaws *b*, or to any other instrument which is to receive it, and then the carrier moves back to receive another blank from the inclined ways. The recess for the reception of the blank in the carrier must be enlarged at *k'* to permit the transferring-fingers to grasp the blank, and when the blanks to be operated upon are so short that the point of the shank will not extend beyond this enlarged space the approach of the fingers is liable to displace it; and to prevent this there is a small spring, *l'*, the end of which bears against the shank of the blank, and when the fingers approach to grasp it the spring yields to permit the blank to be gripped.

The transferring-fingers *j' j'* are jointed together at *m'* to the end of an arm, *n'*, of a rock-shaft, *o'*, and are kept closed by a spring, *p'*, the tension of which forces each against a pin, *q'*, on a projection, *r'*, of the arm *n'*, by which they are guided when closed. The arm *n'* has a projection, *s'*, which rests on a cam, *t'*, so formed as to elevate the fingers at the time required and permit them to be depressed by a spring, $u'$. As the cam $t'$ rotates in the direction of the arrow, in passing from the point 1 to 2 it elevates the fingers above the carrier; and from the point 2 to 3 the cam is concentric, to hold up the fingers while the carrier is operated by its cam to carry out a blank; and from the point 3 to 4 there is a depression in the cam, to permit the fingers to come down and grasp the blank and lift it out of the recess of the carrier. From the point 4 to 5 the said cam is concentric, to hold up the fingers until the carrier moves back, and then from 5 to 6 it gradually approaches the axis, to permit the fingers to descend until the blank is brought in a line with the axis of the mandrel which carries the jaws $b$, and then finally the fingers are moved horizontally to insert the head of the blank into the jaws, and when thus gripped draw back preparatory to being carried up for a repetition of the operation. This lateral movement of the fingers is given by an offset, $v'$, on the face of the cam, which acts on a projecting lip, $w'$, on the part $s'$ of the arm $n'$. The rock-shaft $o'$, to which the arm $n'$ is attached, turns and slides endwise in the rock-shaft $e'$, as shown by dotted lines in Fig. 5, to admit of the lateral movement of the fingers, the said rock-shaft $o'$ being forced in one direction by a spring, $x'$, that bears against the end of it to keep the lips $w'$ against the face of the cam and insure the required motions.

It will be obvious that instead of giving a lateral motion to the lifters to permit them to pass the inclined ways after the blanks have passed out, the same effect may be produced by giving the lateral motion to the inclined ways or sections of them nearest the lifters, and that in case of such change the detector is to be applied to the movable ways, instead of the lifters. In such case the detector may be either a rod passing into a hole in the ways, so that the blanks shall strike against it, or the heads of the blanks can be made to strike against any stationary stop, so as to prevent the lateral motion of the ways until they have descended so far as to indicate that a further supply is required, and then the lateral motion of the ways takes place, to permit the lifters to operate. The grooves in the bottom of the hopper are not indispensable; but it will be found that the machine operates best with them.

I do not wish to be understood as limiting myself to the precise construction and arrangement of parts herein specified, as these may be variously modified within the principle of my invention; but I have described that particular mode of construction which I have essayed with success.

What I claim as my invention, and desire to secure by Letters Patent, is—

1. The lifters which select and lift the blanks, &c., from the hopper, substantially as specified, in combination with ways or conductors, or the equivalents thereof, substantially as specified, into or onto which the blanks, &c, are transferred, as specified.

2. Giving to the lifters or to the inclined ways, or their equivalents, a lateral motion, in combination with a stop or detector, substantially as specified, for the purpose of arresting the operation of the lifters until a further supply is required, as specified.

3. The sliding carrier, with its recess for receiving and holding the screw-blanks, substantially as specified, in combination with the spring-fingers, substantially as specified, for taking the screw-blanks from the carrier and presenting them to the jaws, as specified.

THOS. J. SLOAN.

Witnesses:

H. C. BUNDY,

WM. H. BISHOP.